US010013252B2

(12) United States Patent
Ioannou et al.

(10) Patent No.: US 10,013,252 B2
(45) Date of Patent: Jul. 3, 2018

(54) SOFTWARE DEVELOPMENT COMPLIANCE SYSTEM

(75) Inventors: Andrew Ioannou, San Francisco, CA (US); Andrew Richard Rundell, Ashland, OR (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 926 days.

(21) Appl. No.: 12/761,696

(22) Filed: Apr. 16, 2010

(65) Prior Publication Data
US 2011/0258605 A1    Oct. 20, 2011

(51) Int. Cl.
G06F 9/44        (2018.01)
G06F 8/77        (2018.01)

(52) U.S. Cl.
CPC ....................... *G06F 8/77* (2013.01)

(58) Field of Classification Search
None
See application file for complete search history.

(56) References Cited

U.S. PATENT DOCUMENTS

| 5,379,423 | A * | 1/1995 | Mutoh et al. | |
| 6,507,945 | B1 * | 1/2003 | Rust et al. | 717/103 |
| 6,594,783 | B1 * | 7/2003 | Dollin et al. | 714/38.14 |
| 6,847,384 | B1 * | 1/2005 | Sabadell et al. | 345/672 |
| 7,233,959 | B2 * | 6/2007 | Kanellos et al. | |
| 7,480,893 | B2 | 1/2009 | Berenbach et al. | |
| 7,603,653 | B2 | 10/2009 | Sundararajan et al. | |
| 7,711,527 | B2 * | 5/2010 | Sabadell et al. | 703/2 |
| 2002/0143784 | A1 * | 10/2002 | Sluiman | G06F 11/3612 |
| 2002/0184071 | A1 * | 12/2002 | Bicknell | G06Q 10/0631 717/101 |
| 2003/0200533 | A1 * | 10/2003 | Roberts et al. | 717/124 |
| 2005/0004942 | A1 * | 1/2005 | Madsen | H04L 41/0843 |
| 2005/0065966 | A1 * | 3/2005 | Diab | 707/102 |
| 2005/0066306 | A1 * | 3/2005 | Diab | 717/108 |

(Continued)

FOREIGN PATENT DOCUMENTS

| EP | 1202166 A1 | 5/2002 |
| FR | 2919938 A1 | 2/2009 |

OTHER PUBLICATIONS

"Award-Winning Agile Lifecycle Management Solutions"; Software Live Cycle Management Rally Software; 2009 Rally Software Development Corp.; http://www.rallydev.com/agile_products/lifecycle_management.

(Continued)

*Primary Examiner* — Viva Miller
(74) *Attorney, Agent, or Firm* — Potomac Law Group, PLLC

(57) ABSTRACT

A computer compliance system checks a software application during a software development process. The system receives an object definition file of the software application comprising a definition of a plurality of objects and generates an object hierarchy that describes the plurality of objects. For each rule of a plurality of rules from a rule engine, the system applies the rule to the object hierarchy, and augments the object hierarchy based on one or more new objects that are generated. When all rules have been applied, the system generates a final object hierarchy and converts the final object hierarchy into a predetermined output format.

17 Claims, 7 Drawing Sheets

(56) References Cited

U.S. PATENT DOCUMENTS

| | | | |
|---|---|---|---|
| 2005/0076328 A1* | 4/2005 | Berenbach et al. | 717/104 |
| 2005/0289175 A1* | 12/2005 | Krishnaprasad | G06F 17/30938 |
| 2006/0173892 A1* | 8/2006 | Beck | H04L 69/18 |
| 2006/0195819 A1* | 8/2006 | Chory | G06F 17/3089 |
| | | | 717/117 |
| 2007/0033326 A1* | 2/2007 | Sinclair | G06F 3/0605 |
| | | | 711/103 |
| 2007/0143739 A1* | 6/2007 | Taber, III | 717/114 |
| 2008/0016106 A1* | 1/2008 | Worrall | G06F 17/30091 |
| 2008/0034347 A1 | 2/2008 | V et al. | |
| 2008/0208882 A1* | 8/2008 | Zhang | G06F 17/30303 |
| 2008/0222631 A1* | 9/2008 | Bhatia et al. | 717/178 |
| 2008/0276221 A1* | 11/2008 | Lev et al. | 717/120 |
| 2009/0006147 A1* | 1/2009 | Padmanabhan | G06Q 10/06 |
| | | | 705/7.22 |
| 2009/0055424 A1* | 2/2009 | Zhuang et al. | 707/102 |
| 2009/0106729 A1 | 4/2009 | Adi et al. | |
| 2009/0241104 A1* | 9/2009 | Amiga et al. | 717/174 |

OTHER PUBLICATIONS

Gail E. Kaiser, "Rule-Based Modeling of the Software Development Process"; Columbia University Department of Computer Science, pp. 84-86; http://portal.acm.org/citation.cfm?id=75110.75123&coll+ACM&dl=ACM&CFID=67845292&CFOKEN=14813810, 1988.

* cited by examiner

SOFTWARE DEVELOPMENT COMPLIANCE SYSTEM

FIELD

One embodiment is directed generally to a computer system, and in particular to a computer system for compliance checking of a software development process.

BACKGROUND INFORMATION

A software development process is a structure imposed on the development of a software application/product. There are several known models for the software development process, each describing approaches to a variety of tasks or activities that take place during the process. One model is known as the "waterfall" model. It describes a sequence of tasks (or phases) that may include: stating of requirements, analyzing requirements, designing a solution, architecting a software framework for the solution, developing code, testing, deploying the code, and finally performing a post implementation task such as supporting the code. The different phases substantially differ from each other. Each phase includes tasks that are performed by different roles. Typically, software development tools support specific roles and their relevant tasks and activities in the lifecycle.

Some known software development tools are passive in nature. They check a compliance of a monitored software development phase to a predefined phase scenario—they may indicate that a file must be checked-out before it is edited, that a defect must be opened before a file can be checked-out. These software development task monitors do not actively look for exceptions to the software development phases. They are also limited in their monitoring capabilities to monitoring an occurrence of simple event instances. In addition, software development task monitors do not collaborate and do not support a detection of a complex situation that can be responsive to event instances detected by different software development task monitors.

Other known software development tools focus on only small parts of the overarching problem or tackle larger parts of the problem but are limited to specific development processes and/or technology stacks. For example, standards checking applications check that standards have not been violated within a code that has been produced, but are not aware of the overall design intent. Known design repository applications can generate some of the artifacts needed for the build phase, but are limited to a specific development process and/or technology.

SUMMARY

One embodiment is a computer system that compliance checks a software application during a software development process. The system receives an object definition file of the software application comprising a definition of a plurality of objects and generates an object hierarchy that describes the plurality of objects. For each rule of a plurality of rules from a rule engine, the system applies the rule to the object hierarchy, and augments the object hierarchy based on one or more new objects that are generated. When all rules have been applied, the system generates a final object hierarchy and converts the final object hierarchy into a predetermined output format.

DETAILED DESCRIPTION

One embodiment is a software development compliance system that is responsible for the description and compliance checking of a software application from its conception to its realization but that is not tailored to a particular software development methodology.

In general, the development process for a software application typically includes requirements gathering, functional analysis, technical architecture, design, testing, build, packaging, release, delivery and installation/deployment activities. Each of these steps has deliverables which are tangible objects of some sort or another. There are often relationships between the objects of the different phases and activities for a given development process. If these relationships do not follow a certain predefined pattern there is considered to be one or more "development process exceptions". For example, in a given development process, if a design specifies a database table, a table would be expected to be found in source control after the build activity had taken place.

Embodiments of the present invention store and manage the objects of the different activities making up a development process. Embodiments further describe all the objects of an arbitrary set of software development activities making up any desired software development processes and use the relationships between those objects to check the compliance of the software with the development process. Embodiments further allow a user to store metadata on any of the activities making up the development process, to any desired level of detail. Embodiments further allow a user to define the relationships between the objects based on the chosen development process and either apply relationships to create new objects or test relationships noting "development process exceptions" (i.e., deviations from these relationships) where they occur.

Figure 1:
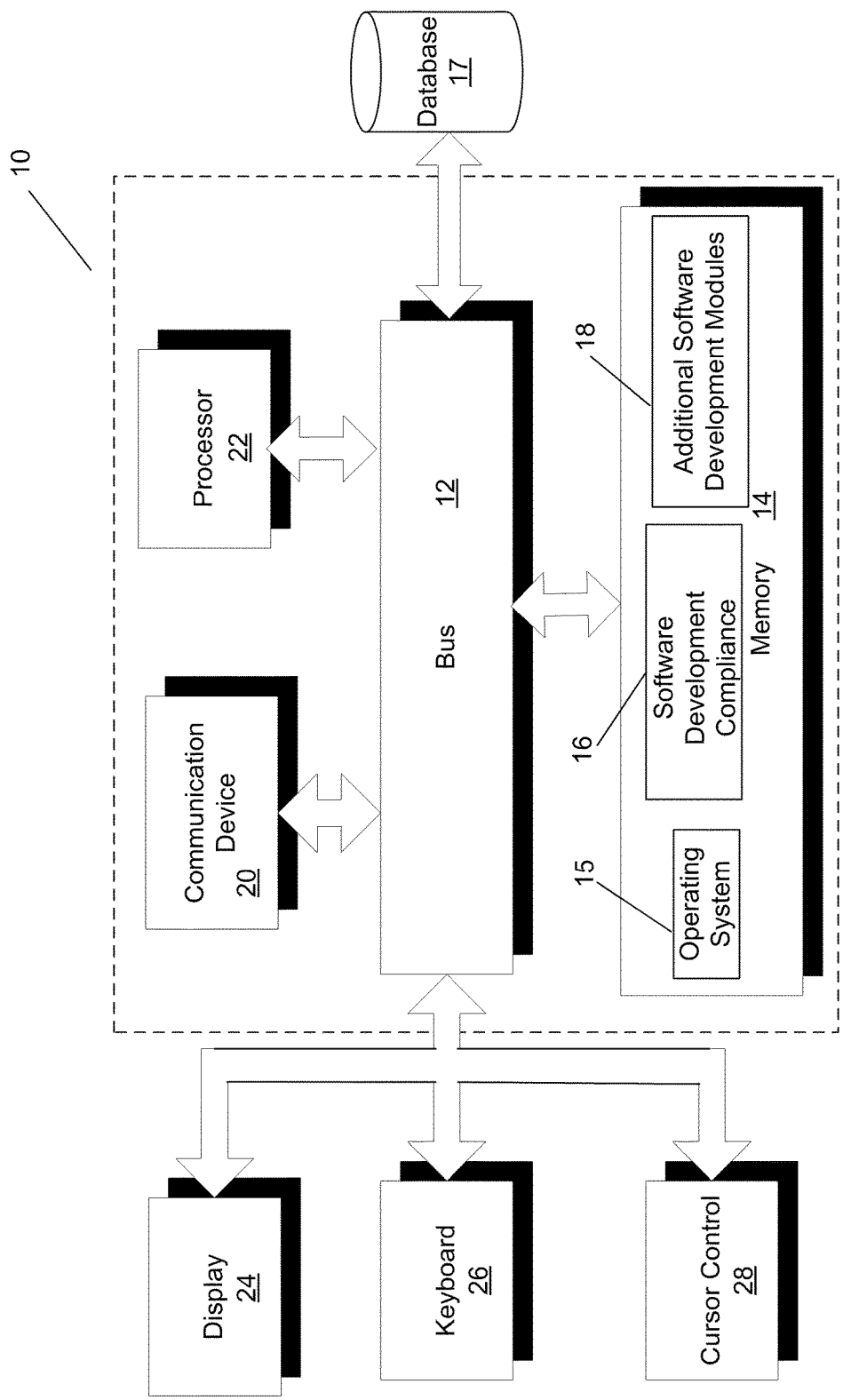
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a software development compliance module 16 that determines whether the software development process is in compliance, as disclosed in more detail below. System 10 can be part of a larger integrated software development system, such as "JDeveloper" from Oracle Corp. Therefore, system 10 will typically include one or more additional functional modules 18 to include the additional functionality. A database 17 may be coupled to bus 12 to provide centralized storage for modules 16 and 18.

Figure 2:
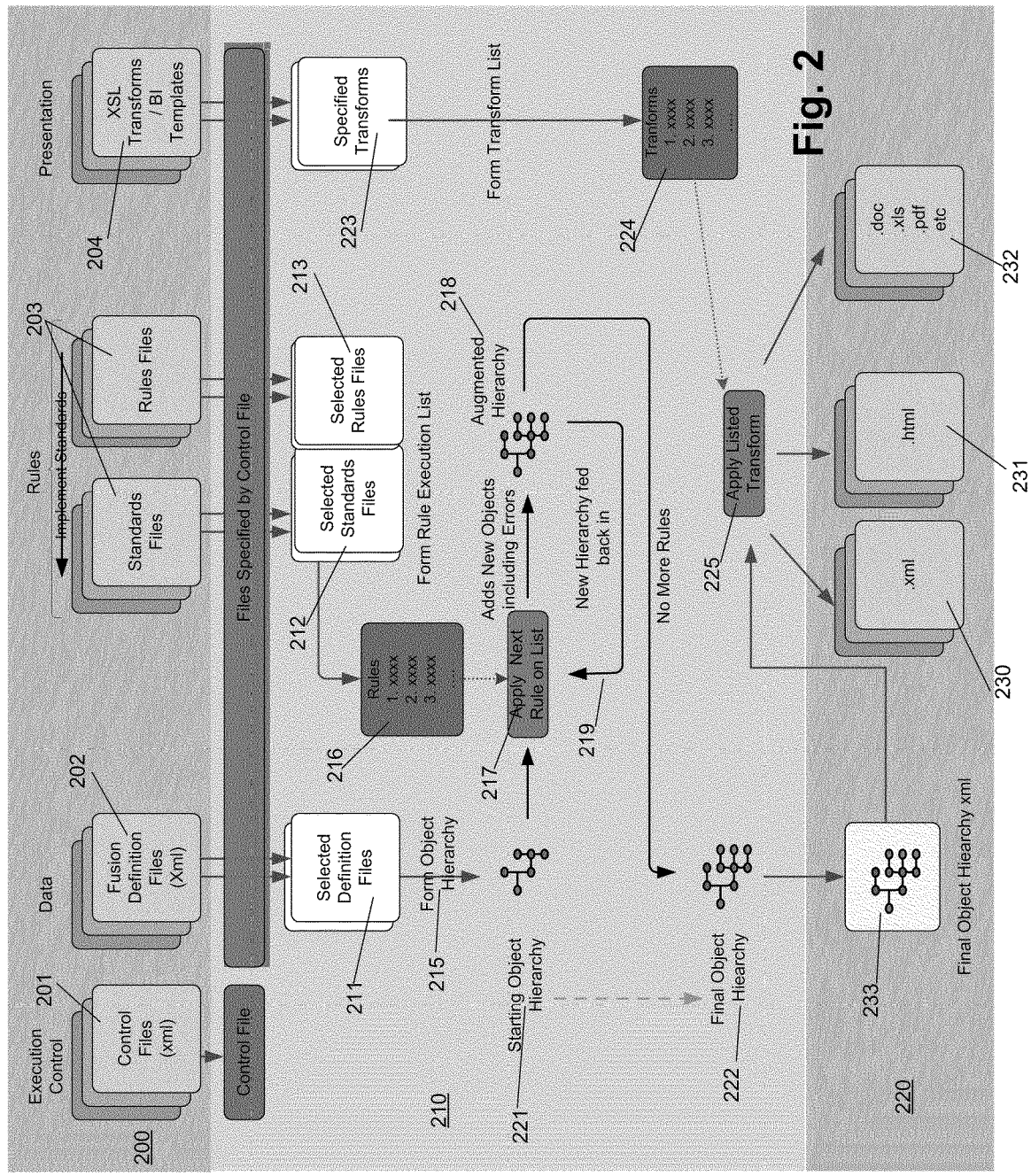
FIG. 2 is an architecture diagram of software development compliance module in accordance with one embodiment of the present invention.

FIG. 2 is an architecture diagram of software development compliance module 16 in accordance with one embodiment of the present invention. The architecture includes input files 200, runtime functionality 210 and output files 220.

The input files include control files 201, which control how the application runs, which definitions to use, which standards to use, and the output presentation format. Definition files 202 are the definitions of the software application objects. Rules files 203 are the rules and standards and relationships to be used in order to determine compliance. Presentation files 204 provide various output file formats.

For runtime functionality 210, selected definition files 211 are used to form an object hierarchy 215. Selected standards files 212 and rules files 213 form a rule execution list 216. The first rule of list 216 is applied to the starting object hierarchy 221. Each rule may add new objects, including errors, to form an augmented hierarchy 218, which is fed back in at 219 to the next rule on the list which is applied. When all rules are complete and have been applied, the final object hierarchy 222 is generated. Specified transforms 223 form a Transforms List 224, which list all predetermined transforms for each type of output.

At output 220, the final object hierarchy 233 is received and each transform listed in 224 is applied to 233 to generate various output files (of varying format) 230-232. Examples of the formats of output files include Extensible Markup Language ("XML") or .xml, Hyper Text Markup Language ("HTML") or .html, a Microsoft Word document or .doc, a Microsoft Excel document or .xls, a Portable Document Format ("PDF") or .pdf, etc.

The object hierarchy 215 describes the objects that define the software, at the desired level of detail, as required by the chosen development process. In one embodiment, the object hierarchy is maintained by the various resources working on the software being developed. The object hierarchy is updated/augmented throughout the software development process, as shown in FIG. 2. The objects in the hierarchy are tailored to the specific development process being used. In one embodiment, objects must, at minimum, have an object "type", the ability to have one or more child objects, and the ability to have any number of properties.

Figure 3:
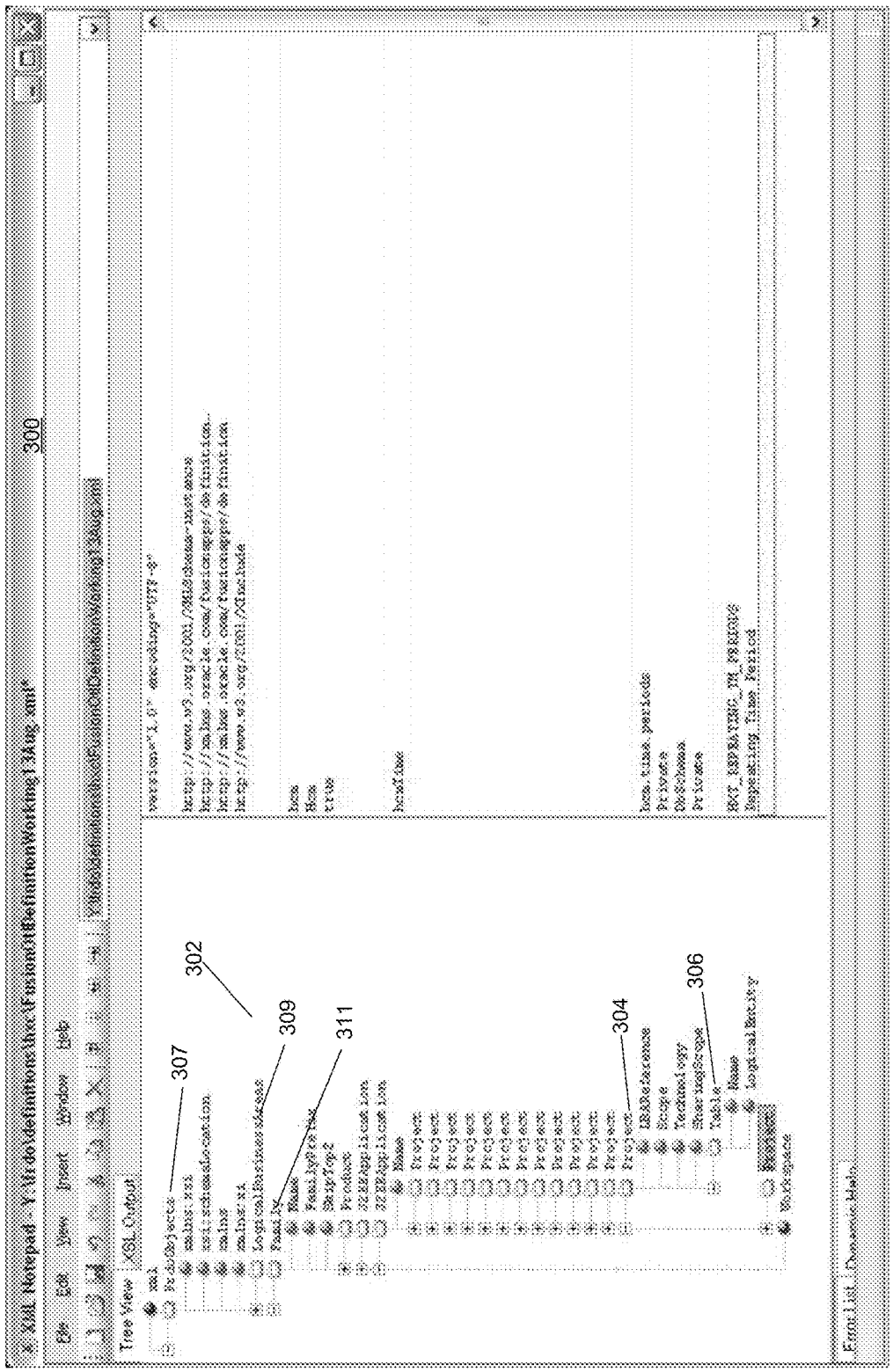
FIG. 3 is a screenshot of an example object definition file in accordance with one embodiment of the present invention.

FIG. 3 is a screenshot 300 of an example object definition file in accordance with one embodiment of the present invention. In the example of FIG. 3, the object definitions are stored as XML and displayed using an XML editor. Since XML satisfies the needed requirements for objects types, child objects and properties, a set of XML files can contain the description of all the objects making up the software, although any type of formats/editors can be used. As shown in the left pane 302, for a particular application, various "Projects" are defined as a folder hierarchy. Each Project includes attributes/properties that can be shown by expanding the folder. For example, for Project 304, attributes such as "Scope", "Technology", etc. are shown. A child object, Table 306, is used to define a schema of a database table. The Table object has "Name" and "Logical Entity" properties.

The object hierarchy that describes the software application may be split into any number of parts for ease of use. For example, the software application may be developed by two different development teams, and it may be desirable for each team to own part of the hierarchy. Therefore, the object hierarchy can be split and maintained in parts and reformed as necessary. The splitting of the hierarchy can be manual or based on rules that split according to object type and values of object properties. In some embodiments, the object hierarchy could be versioned for the purposes of auditing changes.

Figure 4:
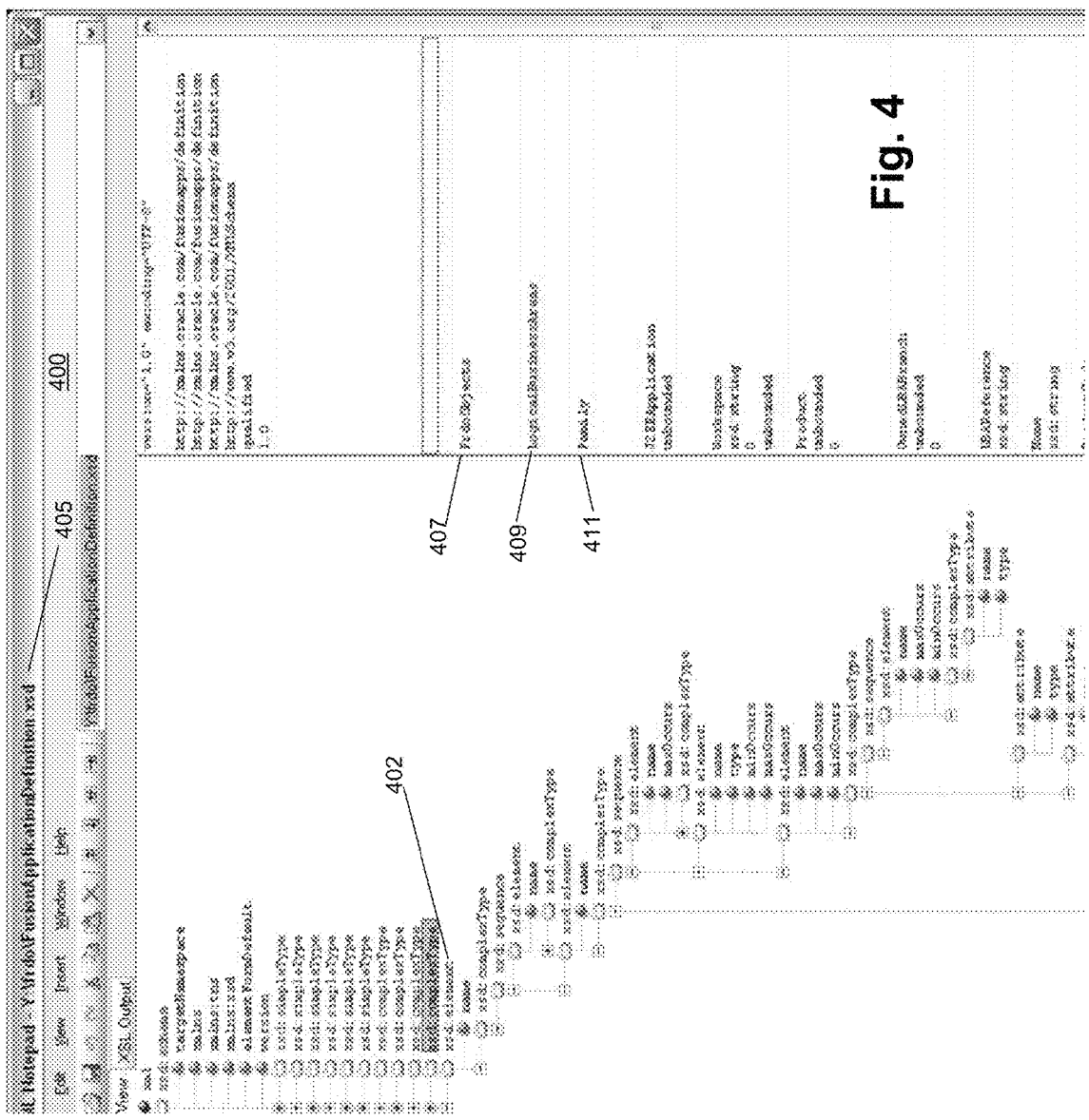
FIG. 4 is a screenshot of an example object hierarchy definition in accordance with one embodiment of the present invention.

FIG. 4 is a screenshot 400 of an example object hierarchy definition in accordance with one embodiment of the present invention. This dictates the information that is collected about the various objects involved in the development process. Element 402 has been expanded. FIG. 4 illustrates a definition of the allowed object hierarchy for the software development process. In the example of FIG. 4, an .xsd file is used to define the hierarchy, as indicated by the filename "FusionApplicationDefinition.xsd" in title bar 405. "xsd: element" 402 expanded has a name of "FrdoObjects" at 407. This corresponds to the very top of the object hierarchy in FIG. 3 (at 307). The next xsd:elements under FrdoObjects 407 in FIG. 4 have names of "LogicalBusinessAreas" 409 and "Family" 411. This corresponds to FIG. 3 where the objects under FrdoObjects 307 are also "LogicalBusinessAreas" 309 and "Family" 311. Therefore, as shown, the .xsd of FIG. 4 maps out the whole hierarchy shown in FIG. 3 and the .xsd file is thus used to define the object hierarchy for the development process. In other embodiments, something other than xsd can be used to define the object hierarchy.

The information which will comprise the software description is wholly dependent on the chosen software development process. Embodiments include a metadata component to define where the objects are expected to be located within the object hierarchy (e.g., which objects may be a child of a given object) and the properties of each of those objects, and also information about the possible values of the properties on those objects. For example, in a JDeveloper based software development environment, a "Project" is a child of a Java Platform, Enterprise Edition ("J2EE") Application. In one embodiment, an XML Schema Document (.xsd file) can be used as metadata because XML files are used to represent the object hierarchy and an XML Schema Document declares the allowed structure of the XML file and therefore the structure of the object hierarchy.

In one embodiment, relationship characterizations are implemented that tie one task with another task of the development process. For example, the way an application is built depends on the design. Thus, objects in the object definition hierarchy that represent design may "imply" or "infer" additional objects and/or properties in the object hierarchy that represent the build. In general, objects added to the software description object hierarchy may imply that other objects and/or properties should exist in the object hierarchy or certain embodiments of those objects and/or properties should be found in external systems. These relationships are definable, with arbitrary granularity, by embodiments of the present invention. The relationship should be realizable such that the inferred objects and/or properties documented by the relationship can be created in the object hierarchy. Relationships are tied to the chosen development process and are provided data for software development compliance module 16, which can process relationships, altering the object hierarchy as necessary and in some cases noting Development Process Exceptions where the relationship does not hold.

As an example of a relationship, assume that a design task/phase shows a database table is required and that the table should be audited. The definition of the object hierarchy for this development process (encoded using metadata described above) indicates that this should be documented as a Table object in the object hierarchy with an Audit property which is set to "Y". In response, embodiments of the invention records the following relationships:

Relationship 1: A Table object with audit property set to "Y" implies that the table must have an additional column to support an audit framework. The column must be called "AUDIT_VERSION_NUMBER". This additional column is to be a Column object with the Table object as the parent. This is a relationship that can be realized by altering the object hierarchy.

Relationship 2: Any Table object implies there must be a .TABLE file on the external source control system named "tableName.TABLE" where tableName is the Name property of the table object. This is a relationship that must hold true.

Relationship 3: Any Column object implies there must be a reference to that column in the TABLE file found on the external source control system. This is a relationship that must hold true.

Processing of these relationships would take place as follows:

Relationship 1: If any Table objects are found in the Software Description Object Hierarchy with an audit property set to "Y" then a Column object is added to the object hierarchy with Name property AUDIT_VERSION_NUMBER, thus realizing the relationship.

Relationship 2: If any Table objects are found in the Software Description Object Hierarchy and a corresponding .TABLE file is not found on the filesystem then the relationship does not hold and a Development Process Exception is noted.

Relationship 3: If any Column objects are found in the Software Description Object Hierarchy and are not detailed in the corresponding .TABLE file on the external control system then the relationship does not hold and a Development Process Exception is noted.

In one embodiment, a rules engine/processor that can execute rules 203 of FIG. 2 executes a set of rules that encode the relationship(s) for the chosen development process. Each rule that is executed can:

Detect the presence of any object or objects in the object hierarchy based on any of its/their characteristic(s) such as object type, location in the hierarchy, properties, values of properties or any combination of those characteristics.

Act on any of the objects so selected.

Add to or modify the object hierarchy by the addition of new, or the modification of existing objects and/or properties (such as 218 of FIG. 2)

Accomplish the above in a procedural approach with the normal programming language constructs such as (but not limited to) control flow and expression evaluation.

Access external systems as appropriate. In a typical development process these external systems could be source control systems, development databases, or application servers.

Raise a Development Process Exception.

Use a combination of the above to encode the logic of part of or the whole of a relationship valid for the chosen development process.

The rules engine can execute any set of rules in a specified order. The result of one rule (i.e., the augmented hierarchy) should be available to the subsequent rule. Since they represent relationships in this example embodiment, rules are data, and are completely dependent on the software development process.

In one embodiment, the rules engine comprises an XML definition of java-based rules. The rules engine compiles rules to java classes then executes rules in a sequence defined by a control file such as control files 201 of FIG. 2. The rules can be grouped into rule sets for easy maintenance and selection.

As disclosed above, when certain relationships do not hold, the relationship characterization results in one or more development exceptions. These exceptions are then appropriately packaged and presented to various resources maintaining the software definition object hierarchy. In most cases, the exceptions can be eliminated by a change to the definition object hierarchy and/or a change to the embodiments of the objects on external systems. The resources involved in the development of the software make these changes with the goal of having no development exceptions such that the software they are developing is compliant with the chosen software development process. In one embodiment, development process exceptions are dealt with by adding them as child objects of a special type in the software development object hierarchy.

In one embodiment, an output component presents the augmented object hierarchy and exceptions in any required format to the stake holders in the development process. Stake holders can be the resources who are maintaining the object hierarchy, but can also include others who are in some way responsible for the software but are not actively involved in building some part of it. Examples of uses of the output in the software development process are as follows:

Reporting of deviations from the development process (exceptions). For example: (a) a listing of all database columns that violate the agreed naming standards; and (b) a listing of all development process exceptions for a given module in the software.

Surfacing of some aspect of the software into a tailored and consumable format. This can be considered as a "slice" through the product definition. Examples include: (a) a listing of database tables from the object hierarchy, which can be included in an otherwise static design document; (b) a listing of interactions between the different modules making up the software development process; and (c) a listing of the text strings displayed to the end users of the product to be reviewed by a documentation team.

Reporting on the progress of development. Since object definitions imply the creation of further objects in the object hierarchy (and objects on external systems) one can track the progress of the creation of those downstream objects as a way of tracking the development of the product.

In one embodiment, an arbitrary set of user defined .xsl transforms is applied to transform any part of the output object hierarchy in to any desired format, such as XML, HTML (so that, for example, the output can be displayed in a wiki), etc.

As examples of an output report, consider the rules 203 of FIG. 2 with the object definition of FIG. 3 and the object hierarchy definition of FIG. 4. Assume the following relationships (labeled 1-4):

1) The Name Property of a Table object must not be greater than 20 characters.
2) A "jprFileName" property for any Project object can be inferred by utilizing other Properties on Project.
3) A file should be found in the external source control system that corresponds to the jprFileName that was inferred in the above relationship.
4) A .TABLE file should be found in the external source control system for each Table object in the object definition file.

Figure 5:
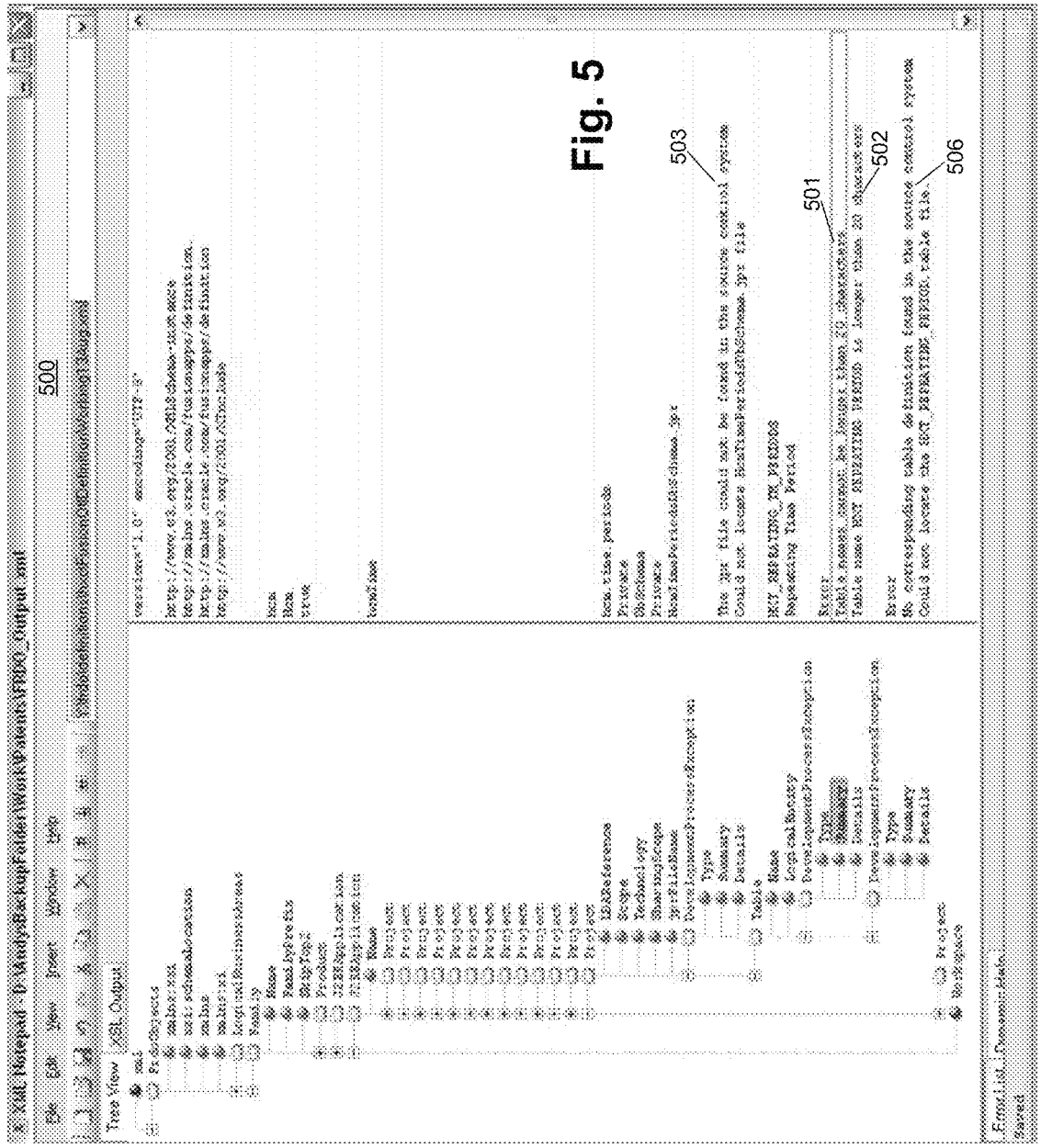
FIG. 5 is a screenshot of a result of a compliance run using the software development compliance module and showing the output object hierarchy in an XML editor in accordance with one embodiment.

FIG. 5 is a screenshot 500 of a result of a compliance run using software development compliance module 16 and showing the output object hierarchy in an XML editor in accordance with one embodiment. The results of the above relationships (i.e., relationships 1-4) are shown in screenshot 500, namely a new jprFileName property on the Project object stemming from relationship #2 (503) and three DevelopmentProcessException objects arising from relationship #s 1, 3 and 4 (501, 502 and 506, respectively).

Figure 6:
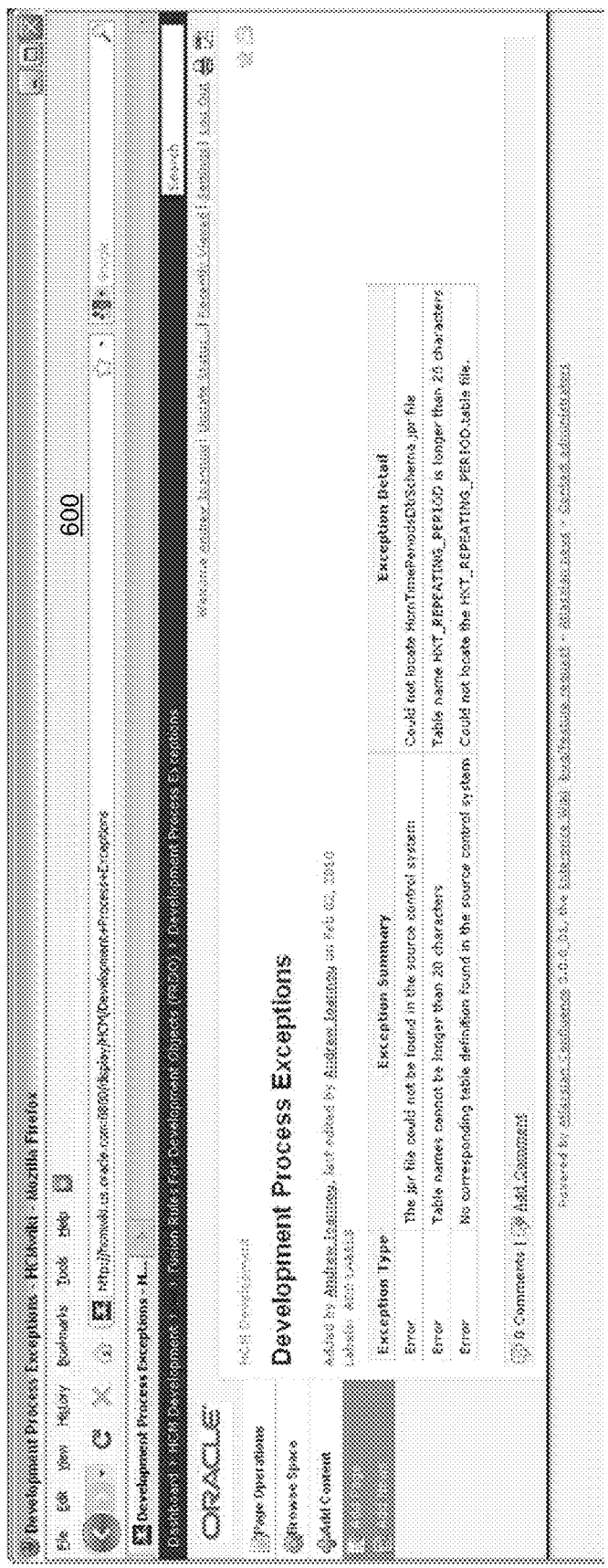
FIG. 6 is a screenshot showing the same output of FIG. 5, but transformed into HTML.

As disclosed, embodiments allow the output to be displayed in many different formats. FIG. 6 is a screenshot 600 showing the same output of FIG. 5, but transformed into HTML. As such, the output may be more easily read by a user or can be provided as part of a wiki-type website.

Figure 7:
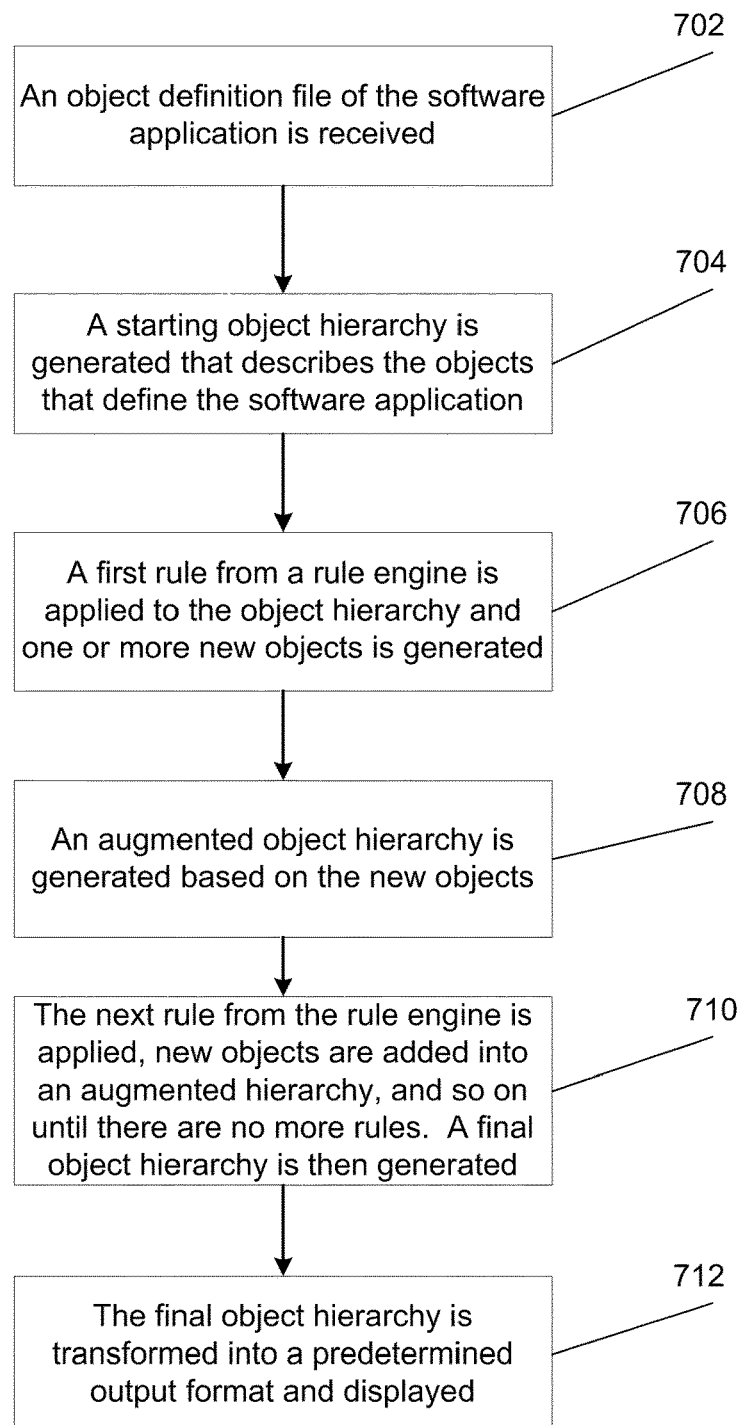
FIG. 7 is a flow diagram of the functionality of the software development compliance module when performing compliance checking of a software application in accordance with one embodiment.

FIG. 7 is a flow diagram of the functionality of software development compliance module 16 when performing compliance checking of a software application in accordance with one embodiment. In one embodiment, the functionality of the flow diagram of FIG. 7 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 702, an object definition file of the software application is received (e.g., object definition file 202 of FIG. 2).

At 704, a starting object hierarchy is generated (from the object definition file) that describes the objects that define the software application (e.g., starting object hierarchy 221 of FIG. 2).

At 706, a first rule from a rule engine is applied to the object hierarchy and one or more new objects are generated. New objects can include software development process exceptions.

At 708, an augmented object hierarchy is generated based on the new objects (e.g., augmented hierarchy 218 of FIG. 2).

At 710, the next rule from the rule engine is applied, new objects are added into an augmented hierarchy, and so on until there are no more rules. A final object hierarchy (such as final object hierarchy 233 of FIG. 2) is then generated.

At 712, the final object hierarchy is transformed into a predetermined output format (such as output formats 230-232 of FIG. 2) and displayed.

As disclosed, embodiments of the present invention perform software application compliance by generating an object hierarchy, and applying rules to the hierarchy, while modifying the object hierarchy based on the application of the rules. This provides for a centralized overview of the development process in as much detail as desired. Further, embodiments can check the compliance of a portion of a software application to a given development process at a level of detail chosen by the user because the user can capture the definition of the software in as much detail as desired and write as many relationships as desired.

Further, embodiments provide the ability to synchronize the various phases of development. For example, a design may imply certain objects must be present in external systems such as source control. This means that downstream activities are tied to earlier decisions. But later changes to the objects in the external system will create Development Process Exceptions if the changes are not consistent with the relationships defined for the chosen software development process. Therefore, two or more phases of development may be synchronized with embodiments of the present invention by defining appropriate relationships.

Embodiments further provide for collaborative effort in the development of standards checking. Relationships and the structure of the software definition can be worked on by all the stakeholders and participants in the development process. Further, embodiments provides a smooth transition between phases of the development process and allow stakeholders of any phase in the development to cross check their deliverables against upstream and downstream deliverables.

Embodiments further allow for "live" documentation of a developing software product and encourage an iterative development process. Iterative development has shown itself to be a very effective mode of software development. However, one problem with working iteratively is that it is very difficult to track what is going on. Embodiments of the present invention can be used to give a very clear picture of the state of the product being developed and therefore mitigate the downside of the iterative development style.

Rather than having rules run on a clear cut phase of development, as is done by some prior art, embodiments of the present invention allow the rules to run on the entire object hierarchy, which can encompass any number of phases. In contrast to prior art which tries to solve the problem of matching phases for a given development process where the technologies are known, for embodiments of the present invention it does not matter what the development process is or what the technology stack is—the entire development process can be modeled by specifying an object hierarchy that encompasses any number of development phases. The rules work on those objects, plus any access to external systems, augmenting the object hierarchy or logging software development process exceptions.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to compliance check a software application during a software development process, the compliance check comprising:

receiving an object definition file defining a plurality of software application objects;

generating a starting object hierarchy from the object definition file, the starting object hierarchy including a plurality of objects;

creating an augmented object hierarchy from the starting object hierarchy by applying a first rule of a plurality of rules from a rule engine to the starting object hierarchy;

applying each subsequent rule of the plurality of rules from the rule engine to the augmented object hierarchy, including:

detecting one or more objects in the augmented object hierarchy based on at least one of an object type, an object location within the augmented object hierarchy, an object property or an object property value, for each object detected by the subsequent rule:
determining whether to modify the detected object based on the subsequent rule, and modifying the detected object if so determined;
determining whether to create one or more new objects based on the subsequent rule, creating the new objects if so determined, and adding the new objects to the augmented object hierarchy, one or more new objects comprising a software development process exception; and
creating a new version of the augmented object hierarchy for use by the next rule;

when all rules have been applied, generating a final object hierarchy from the augmented object hierarchy; and modifying at least one object definition in the object definition file to eliminate at least one software development process exception.

2. The computer readable medium of claim 1, further comprising metadata that defines a location of the objects in the object hierarchy.

3. The computer readable medium of claim 2, wherein the metadata comprises an Extensible Markup Language Schema Document.

4. The computer readable medium of claim 1, wherein the software development process comprises defined relationships, and the software development process exception indicates a change that is inconsistent with the relationships.

5. A computer implemented method for compliance checking a software application during a software development process, the method comprising:

receiving an object definition file defining a plurality of software application objects;

generating a starting object hierarchy from the object definition file, the starting object hierarchy including a plurality of objects;

creating an augmented object hierarchy from the starting object hierarchy by applying a first rule of a plurality of rules from a rule engine to the starting object hierarchy;

applying each subsequent rule of the plurality of rules from the rule engine to the augmented object hierarchy, including:

detecting one or more objects in the augmented object hierarchy based on at least one of an object type, an object location within the augmented object hierarchy, an object property or an object property value, for each object detected by the subsequent rule:
determining whether to modify the detected object based on the subsequent rule, and modifying the detected object if so determined;
determining whether to create one or more new objects based on the subsequent rule, creating the new objects if so determined, and adding the new objects to the augmented object hierarchy, one or more new objects comprising a software development process exception; and
creating a new version of the augmented object hierarchy for use by the next rule;

when all rules have been applied, generating a final object hierarchy from the augmented object hierarchy; and modifying at least one object definition in the object definition file to eliminate at least one software development process exception.

6. The method of claim 5, further comprising metadata that defines a location of the objects in the object hierarchy.

7. A software development compliance system, comprising:

a processor; and a memory, coupled to the processor, storing instructions that cause the processor to compliance check a software application during a software development process, the compliance check comprising:

receiving an object definition file defining a plurality of software application objects;

generating a starting object hierarchy from the object definition file, the starting object hierarchy including a plurality of objects;

creating an augmented object hierarchy from the starting object hierarchy by applying a first rule of a plurality of rules from a rule engine to the starting object hierarchy;

applying each subsequent rule of the plurality of rules from the rule engine to the augmented object hierarchy, including:

detecting one or more objects in the augmented object hierarchy based on at least one of an object type, an object location within the augmented object hierarchy, an object property or an object property value, for each object detected by the subsequent rule:
determining whether to modify the detected object based on the subsequent rule, and modifying the detected object if so determined;
determining whether to create one or more new objects based on the subsequent rule, creating the new objects if so determined, and adding the new objects to the augmented object hierarchy, one or more new objects comprising a software development process exception; and
creating a new version of the augmented object hierarchy for use by the next rule;

when the rules have been applied, generating a final object hierarchy from the augmented object hierarchy; and modifying at least one object definition in the object definition file to eliminate at least one software development process exception.

8. The computer readable medium of claim 1, wherein the compliance check further comprises:

converting the final object hierarchy into a predetermined output format.

9. The method of claim 5, further comprising:
converting the final object hierarchy into a predetermined output format.

10. The system of claim 7, wherein the compliance check further comprises:
converting the final object hierarchy into a predetermined output format.

11. The system of claim 7, further comprising metadata that defines a location of the objects in the object hierarchy.

12. The computer readable medium of claim 1, wherein the software development process comprises a plurality of phases of development, and the final object hierarchy comprises the plurality of phases.

13. The method of claim 5, wherein the software development process comprises a plurality of phases of development, and the final object hierarchy comprises the plurality of phases.

14. The system of claim 7, wherein the software development process comprises a plurality of phases of development, and the final object hierarchy comprises the plurality of phases.

15. The computer readable medium of claim 1, wherein said applying the first rule to the starting object hierarchy includes:
detecting one or more objects in the starting object hierarchy based on at least one of an object type, an object location within the starting hierarchy, an object property and an object property value; and
for each object detected by the first rule:
determining whether to modify the detected object based on the first rule, and modifying the detected object if so determined, and
determining whether to add one or more new objects based on the first rule, and adding the new objects to the starting object hierarchy if so determined.

16. The method of claim 5, wherein said applying the first rule to the starting object hierarchy includes:
detecting one or more objects in the starting object hierarchy based on at least one of an object type, an object location within the starting hierarchy, an object property and an object property value; and
for each object detected by the first rule:
determining whether to modify the detected object based on the first rule, and modifying the detected object if so determined, and
determining whether to add one or more new objects based on the first rule, and adding the new objects to the starting object hierarchy if so determined.

17. The system of claim 7, wherein said applying the first rule to the starting object hierarchy includes:
detecting one or more objects in the starting object hierarchy based on at least one of an object type, an object location within the starting hierarchy, an object property and an object property value; and
for each object detected by the first rule:
determining whether to modify the detected object based on the first rule, and modifying the detected object if so determined, and
determining whether to add one or more new objects based on the first rule, and adding the new objects to the starting object hierarchy if so determined.

* * * * *

UNITED STATES PATENT AND TRADEMARK OFFICE
CERTIFICATE OF CORRECTION

PATENT NO. : 10,013,252 B2
APPLICATION NO. : 12/761696
DATED : July 3, 2018
INVENTOR(S) : Ioannou et al.

It is certified that error appears in the above-identified patent and that said Letters Patent is hereby corrected as shown below:

In the Specification

In Column 6, Line 11, after "FIG. 2)" insert -- . --.

Signed and Sealed this
Second Day of April, 2019

Andrei Iancu
*Director of the United States Patent and Trademark Office*